US012609512B2

(12) United States Patent
Menken

(10) Patent No.: US 12,609,512 B2
(45) Date of Patent: Apr. 21, 2026

(54) SPARK PLUG WITH A SEALING EARTH ELECTRODE

(71) Applicant: Robert Bosch GmbH, Stuttgart (DE)

(72) Inventor: Lars Menken, Donzdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/716,167

(22) PCT Filed: Nov. 21, 2022

(86) PCT No.: PCT/EP2022/082656
§ 371 (c)(1),
(2) Date: Jun. 26, 2024

(87) PCT Pub. No.: WO2023/110308
PCT Pub. Date: Jun. 22, 2023

(65) Prior Publication Data

US 2025/0038488 A1 Jan. 30, 2025

(30) Foreign Application Priority Data

Dec. 17, 2021 (DE) ..................... 10 2021 214 623.6

(51) Int. Cl.
*H01T 13/32* (2006.01)
*H01T 21/02* (2006.01)
*H01T 13/46* (2006.01)
*H01T 13/54* (2006.01)

(52) U.S. Cl.
CPC ............ *H01T 13/32* (2013.01); *H01T 21/02* (2013.01); *H01T 13/467* (2013.01); *H01T 13/54* (2013.01)

(58) Field of Classification Search
CPC ....... H01T 13/32; H01T 13/54; H01T 13/467; H01T 21/02
USPC .......................................................... 313/118
See application file for complete search history.

(56) References Cited

U.S. PATENT DOCUMENTS 3,831,562 A * 8/1974 Paxton .................... F02B 53/12 313/143
4,963,784 A * 10/1990 Niessner ............... H01T 13/467 313/143
2013/0206122 A1 8/2013 Chiera et al.
2014/0252941 A1 9/2014 Broudno
(Continued)

FOREIGN PATENT DOCUMENTS

CN 207218004 U 4/2018
DE 102006000070 A1 9/2006
DE 102010004851 A1 6/2011
(Continued)

OTHER PUBLICATIONS

International Search Report issued in PCT/EP2022/082656 on May 8, 2023.

*Primary Examiner* — Christopher M Raabe
(74) *Attorney, Agent, or Firm* — NORTON ROSE FULBRIGHT US LLP

(57) ABSTRACT

A spark plug. The spark plug includes a housing; an insulator arranged within the housing; a center electrode arranged within the insulator; and an earth electrode arranged within the housing and between the housing and the insulator. The earth electrode and the center electrode are arranged such that they form a spark gap, and the spark gap is within the housing.

10 Claims, 4 Drawing Sheets

(56) References Cited

U.S. PATENT DOCUMENTS

| | | | |
|---|---|---|---|
| 2015/0162725 | A1 | 6/2015 | Yamada et al. |

FOREIGN PATENT DOCUMENTS

| | | | |
|---|---|---|---|
| DE | 102018105181 | A1 | 9/2019 |
| EP | 3264545 | A1 | 1/2018 |
| JP | 2010118236 | A | 5/2010 |
| WO | 2022238038 | A1 | 11/2022 |

* cited by examiner

SPARK PLUG WITH A SEALING EARTH ELECTRODE

FIELD

The present invention relates to a spark plug and to a production method.

BACKGROUND INFORMATION

In modern combustion engines, it is common to ignite at high combustion chamber pressures in order to achieve a high degree of efficiency. This requires a spark plug with a small electrode spacing, since otherwise there is a very high ignition voltage requirement. However, it is very complex and difficult to produce very small electrode spacings in a reliable process. Currently, the spark plug is fully fitted and at the end of the production process the electrode spacing is produced by aligning the earth electrode, for which a plastically deformable earth electrode is required.

With previous spark plug concepts, the earth electrode is arranged on the combustion chamber-side housing end face. This has the advantage that sufficient space is available for aligning the earth electrode. However, due to its arrangement on the housing end face, the earth electrode is also in an exposed position in the combustion chamber, as a result of which the earth electrode absorbs a lot of heat from the combustion chamber and transfers it to the spark plug. In order to reduce the heat input through the earth electrode into the spark plug, earth electrodes are already being formed as side electrodes and positioned laterally to the center electrode, as a result of which the earth electrode no longer protrudes so far into the combustion chamber and the temperatures of the earth electrode and the spark plug remain lower.

SUMMARY

Hydrogen is increasingly being used as a fuel in combustion engines. If hydrogen is used, an even higher combustion chamber pressure arises. Hydrogen burns very quickly, such that ignition takes place at a later point in time and at a higher combustion chamber pressure than with other fuels. This in turn makes it necessary to produce a very small electrode spacing.

In addition, hydrogen tends to self-ignite even at comparatively low temperatures. To prevent this self-ignition, all spark plug components must be as cold as possible.

An object of the present invention is to provide a spark plug that has a low component temperature and a small electrode spacing that can be set in a reliable process.

This object may be achieved in the spark plug according to the present invention, the earth electrode is arranged between the housing and the insulator, wherein the earth electrode and the center electrode are arranged so that they form a spark gap that is arranged within the housing.

The spark plug according to the present invention has a housing, an insulator arranged within the housing, a center electrode arranged within the insulator, and an earth electrode arranged within the housing and, in particular with at least one portion, between the housing and the insulator, wherein the earth electrode and the center electrode are arranged such that they form a spark gap and the spark gap is formed within the housing. According to an example embodiment of the present invention, the earth electrode, in particular with at least one portion, is arranged between the housing and the insulator, wherein the earth electrode and the center electrode are arranged such that they form a spark gap and the spark gap is formed within the housing. This has the advantage that very small electrode spacings can be produced with simple fitting at the same time. The earth electrode can already be arranged on the spark plug cap, the insulator having the center electrode, resistor element and connecting bolt, and fitted together with the spark plug gap in the housing. Prior to fitting the spark plug cap, the electrode spacing and the spark gap can be set, such that a radial positioning of the earth electrode and the spark gap are easier to produce. In particular, this is advantageous for a spark plug with a retracted/negative spark position. If the spark gap is formed within the housing, the space within the housing is naturally very limited. Accordingly, it is difficult to align the electrode spacing in a reliable process after the fitting of the spark cap in the housing, in particular if one wants to set very small electrode spacings. The retracted spark position and the arrangement of the electrodes within the housing have the further advantage that the earth electrode and the center electrode can be formed shorter. As a result, they project less into the combustion chamber. On the one hand, the electrodes absorb less heat from the combustion chamber and, on the other hand, the heat dissipation from the electrodes via the housing into a cylinder head, in which the spark plug according to the present invention is fitted, is more effective.

Further advantageous embodiments of the present invention are disclosed herein.

A further development of the present invention provides that the earth electrode is in contact with the insulator and the housing. As a result, all components of the spark plug are kept at a low temperature level. Since the earth electrode establishes good thermal contact between the insulator and the housing. In particular, at least one portion of the earth electrode is clamped between the housing and the insulator. As a result, reliable thermal contact between the housing and the insulator is established by means of the earth electrode. Furthermore, sufficiently good electrical contact between the earth electrode and the housing arises, such that a welded connection between the earth electrode and the housing can be dispensed with.

Furthermore, it is advantageous if the earth electrode is also a sealing element, wherein the earth electrode seals the intermediate space between the insulator and the housing. It simplifies the production method and guarantees good thermal contact between the insulator, earth electrode and housing. The earth electrode is clamped between the housing and the insulator, for example, and thus fulfills the function of a sealing element and a thermal contact element between the insulator and the housing. Furthermore, a separate sealing element at the combustion chamber-side end of the intermediate space between the housing and the insulator can be dispensed with.

For example, the housing can have a projection on its inner side, wherein the earth electrode is arranged between the housing projection and the insulator and provides a seal. The projection can, for example, be formed along the entire circumference of the inner side of the housing. The advantages described above arise.

In one example embodiment of the spark plug according to the present invention, the earth electrode has a base body, wherein the base body is annular. For example, the base body is the portion of the earth electrode that is arranged or clamped between the housing and the insulator. In particular, the earth electrode is in contact with a portion of its annular base body along the circumference of the insulator, such that the above-mentioned advantages arise.

In a further development of the present invention, the annular base body of the earth electrode can have at least one inwardly directed support arm that, together with the center electrode, forms the spark gap. For example, the support arm can be formed along the entire inner circumference of the annular base body, such that an annular radial spark gap arises around the center electrode. Alternatively, the base body can have a plurality of support arms, which in each case form a spark gap with the center electrode and are spaced apart relative to one another along the inner circumference of the annular base body. A plurality of radial spark gaps spaced apart relative to one another then arise around the center electrode. For example, the annular base body or the support arm or the support arms can have a spark element. The spark element is made of a precious metal or a precious metal alloy. The base body and, if applicable, the support arm or support arms are made of a Ni-based alloy.

In an advantageous further development of the embodiments of the spark plug according to the present invention, the spark gap has a spacing T of T=0.1 mm or greater and/or T=15 mm or less from a combustion chamber-side end face of the housing. The spacing T extends from the end face of the combustion chamber-side housing to the combustion chamber-side end of the spark gap. As a result, the spark gap is arranged within the housing. Due to this negative spark position, the possibility arises of designing the center electrode and the insulator shorter than usual, such that on the one hand the center electrode and the insulator do not protrude as far into the combustion chamber and the path for heat dissipation is shorter and thus the heat dissipation is more effective.

Advantageously, for example, the width of the spark gap is not greater than 0.3 mm, in particular not greater than 0.15 mm. The smaller the spark gap, the lower the voltage required to generate an ignition spark.

According to an example embodiment of the present invention, it is also advantageous that the width of the spark gap is at least 0.05 mm, in particular not less than 0.1 mm. As a result, the spark gap is not too small. A very small spark gap poses particular challenges for accuracy during spark plug production. A deviation from the most parallel possible alignment of the electrode spark surfaces has a greater effect with a small spark gap, such as uneven wear of the spark surface, than with a larger spark gap. Thus, the lower limit for the width of the spark gap is a good compromise for a small spark gap to reduce the ignition voltage requirement and wear on the one hand, and on the other hand a justifiable effort for a consistently good quality of the alignment of the spark surfaces to one another during spark plug production.

The spark plug according to the present invention and its further developments are a hydrogen spark plug, which is configured to be used in a hydrogen-powered engine and to ignite the ignitable hydrogen-containing fuel-air mixture. The fuel can contain up to 100% hydrogen, i.e., the fuel can be hydrogen or a hydrogen-gas mixture.

However, the spark plug according to the present invention is not limited to operation with hydrogen. The spark plug according to the present invention can also be used for natural gas or gasoline internal combustion engines. However, the spark plug according to the present invention is optimized for operation with hydrogen.

The present invention also relates to a production method for a spark plug according to the present invention. According to an example embodiment of the present invention, the method includes the following steps:

a) providing a pre-fitted spark plug cap with an insulator and a center electrode,
b) providing the earth electrode,
c) attaching the earth electrode to the spark plug cap,
d) aligning the earth electrode and setting the spark gap,
e) fastening the earth electrode to the spark cap.

In a further development of the present invention, steps c) and d) can be a common method step.

According to an example embodiment of the present invention, a further method step provides that the spark plug cap, together with the earth electrode, is inserted and fastened in a housing.

By attaching and arranging the earth electrode on the spark plug cap before the spark plug cap is fitted in the housing, the advantage arises that the electrodes can be aligned relative to one another more easily and the electrode spacing can be set more easily, since there is more space available for the tools for aligning the electrode spacing compared to the very limited space if the spark plug cap is already fitted in the housing and the spark gap is to be aligned within the housing. After aligning the electrodes and setting the electrode spacing, the earth electrode is fastened to the insulator, such that the earth electrode no longer changes its position in relation to the center electrode and the insulator. The spark plug cap is then fitted in the housing with the earth electrode. After fitting, the earth electrode is arranged with at least one portion between the housing and the insulator. In particular, the earth electrode can seal the intermediate space between the housing and the insulator. For example, the earth electrode is connected to the insulator by a press fit.

DETAILED DESCRIPTION OF EXAMPLE EMBODIMENTS

Figure 1:
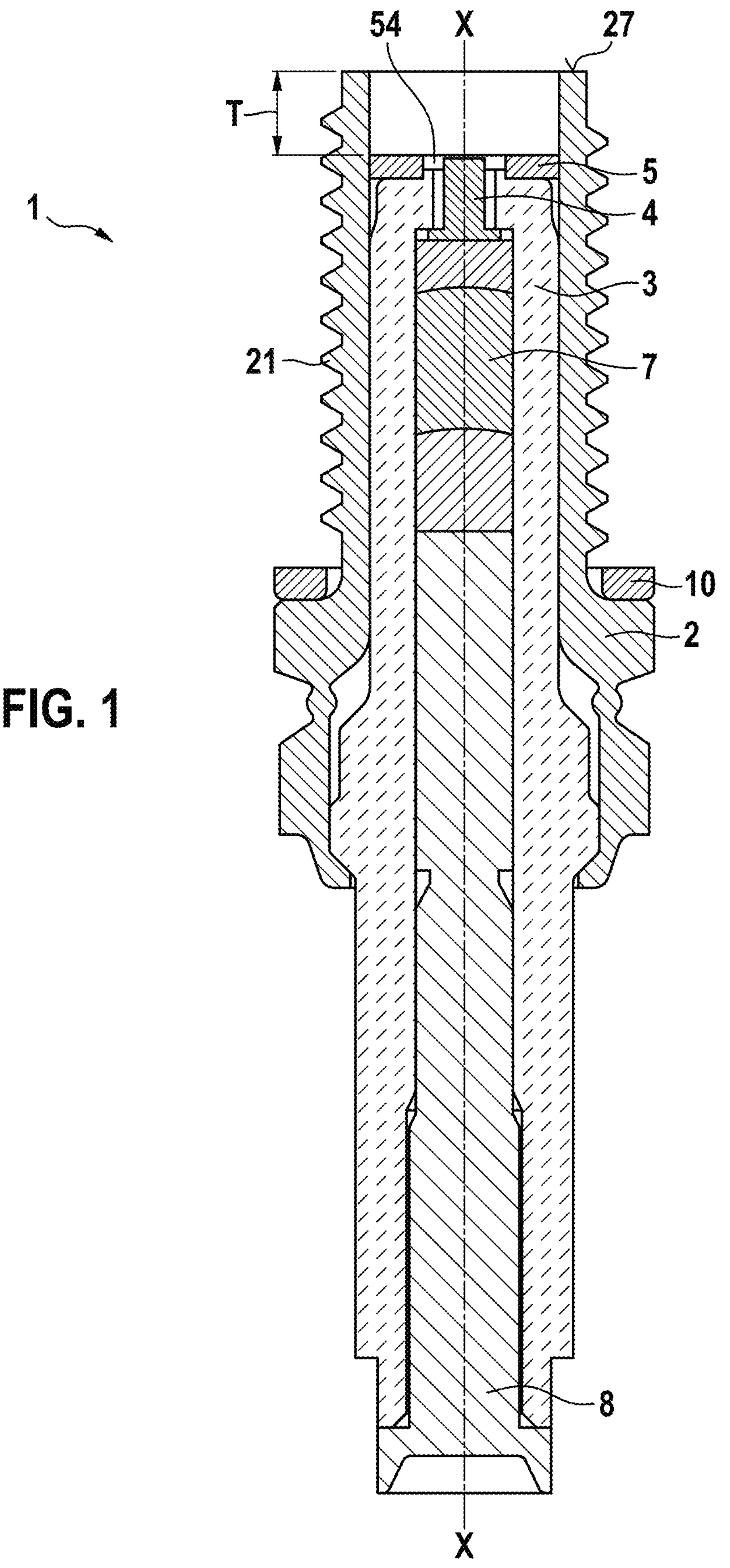
FIG. 1 shows a spark plug according to an example embodiment of the present invention.

FIG. 1 schematically shows a spark plug 1 according to the present invention. The spark plug 1 has a housing 2, an insulator 3 arranged within the housing 2, a center electrode 4 arranged within the insulator 3 and an earth electrode 5 arranged within the housing 2. The earth electrode 5 is formed as a side electrode and is arranged between the housing 2 and the insulator 3, for example clamped or pressed in. The center electrodes 4 and the earth electrode 5 together form a radial spark gap 54. The spark gap 54 has a spacing T from the combustion chamber-side end face 27 of the housing 2 and is formed within the housing 2.

The spark plug 1 has a connecting bolt 8 and a resistor element 7 arranged in the insulator 3. The connecting bolt 8 and the center electrode 4 are in electrical contact with one another via the resistor element 7. An outer seal 10 is arranged on the outer side of the housing and a thread 21 is formed, with which the spark plug 1 can be screwed into a cylinder head. The outer seal 10 seals the transition between spark plug 1 and the cylinder head.

Figure 2:
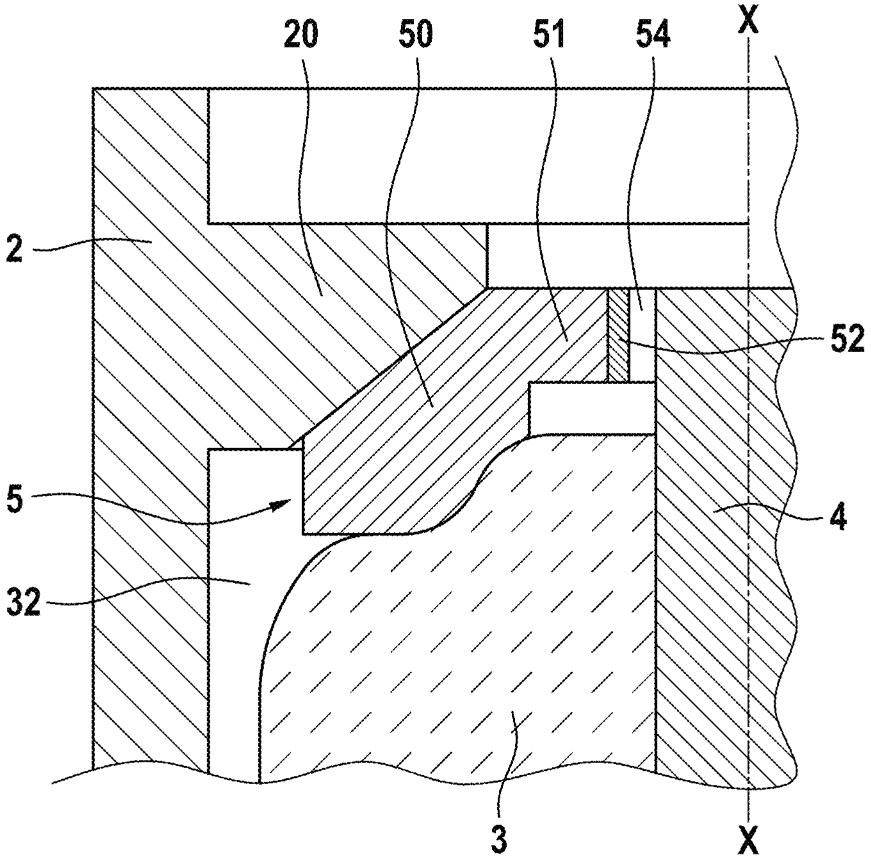
FIG. 2 shows the combustion chamber-side end of the spark plug, according to an example embodiment of the present invention.

FIG. 2 shows an example of the embodiment of the combustion chamber-side portion of the spark plug 1 and the arrangement of the earth electrode 5 between the housing 2 and the insulator 3. The housing 2 has a projection 20 on its inner side, which extends radially inward in the direction of the longitudinal axis X of the spark plug 1. The projection 20 is formed, for example, along the entire circumference of the inner side of the housing 2. The earth electrode 5 is clamped between the projection 20 and the insulator 3, such that the earth electrode 5 is fixed in this position on the one hand and serves as a sealing element on the other hand. The earth electrode 5 seals the intermediate space 32 between the housing 2 and the insulator 3.

For example, a step is formed at the combustion chamber-side end of the insulator 3, onto which the earth electrode 5 is attached. For example, due to the step on the insulator 3, a form-fitting connection arises between the earth electrode 5 and the insulator 3. This form-fitting connection fixes the earth electrode 5 to the insulator 3. Alternatively, the earth electrode 5 can also be fixed to the insulator 3 by means of an integral connection, such as an adhesive connection. It is also possible that the earth electrode 5 is first pre-fixed to the spark plug cap and then finally fixed in the housing 2 by fitting the spark plug cap with the earth electrode 5.

The earth electrode 5 has a base body 50 and, in this example, a support arm 51, which extends radially inward in the direction of the longitudinal axis x of the spark plug 1. The support arm 51 can be formed along the entire inner circumference of the annular base body 50 of the earth electrode 5, such that an annular spark gap 54 with a uniform width, for example, i.e. a uniform spacing between the earth electrode 5 and the center electrode 4, arises. Alternatively, a plurality of support arms 51 can also be arranged on the base body 50, which are spaced apart relative to one another along the inner circumference of the base body 50.

The base body 50 of the earth electrode 5 and the support arm 51 or the support arms 51 are made of a Ni-based alloy. The base body 50 or the support arm 51 or the support arms 51 can have a spark element 52 made of a precious metal or a precious metal alloy.

The features "housing with a projection", "insulator with a step" and "earth electrode with a support arm" can be produced together with one design of the spark plug 1 according to the present invention, or each can be produced individually in a respective design, or one design has two of the three features.

Figure 3A:
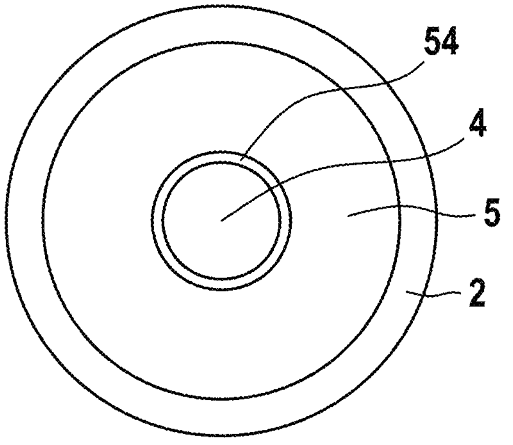
FIGS. 3A-3C show a top view of various examples of producing the spark gap according to the present invention.
Figure 3B:
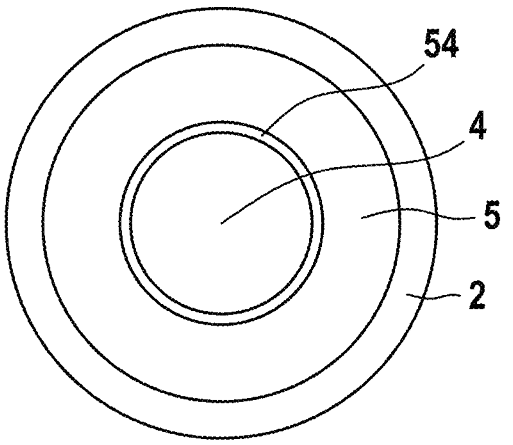
Figure 3C:
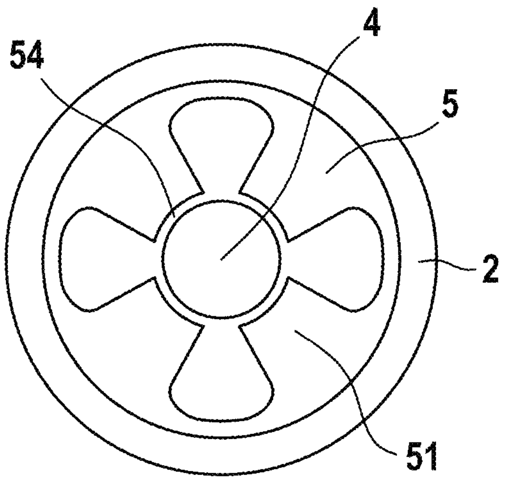

FIGS. 3A-3C show three examples of the formation of the radial spark gap 54. The end of the spark plug 1 on the combustion chamber-side end is shown as a top view looking in the direction of the combustion chamber. From the outside in, one can see the housing 2, the earth electrode 5, the spark gap 54 and the center electrode 4.

The spark plug 1 according to the present invention enables a highly variable embodiment of the spark gap 54 in terms of position and shape. In FIG. 3A, the spark gap 54 is arranged more centrally. In FIG. 3B, the spark gap 54 is arranged further out. In both examples, the spark gap 54 has the same ring shape and a uniform width. In FIG. 3C, the earth electrode 5 has a plurality of support arms 54, which are spaced apart relative to one another along the circumference of the earth electrode 5. As a result, a plurality of radial spark gaps 54 arises.

Figure 4:
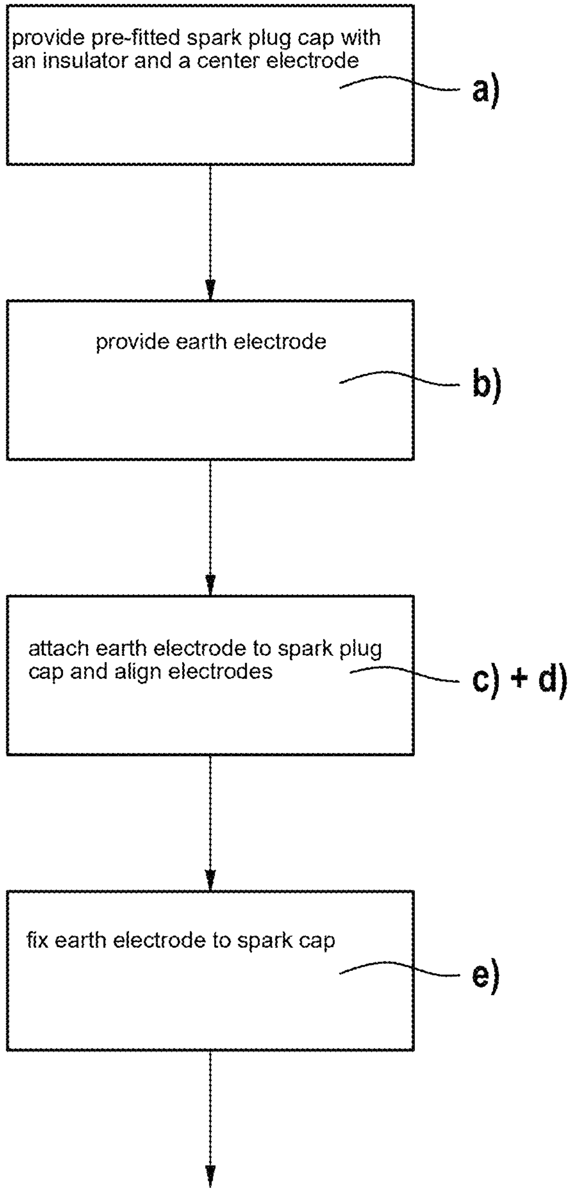
FIG. 4 schematically shows the production method, according to an example embodiment of the present invention.

FIG. 4 shows a schematic diagram of the production method. In the first step a), a pre-fitted spark plug cap with an insulator 3 and center electrode 4 is provided. In the second step b), the earth electrode 5 is provided. In the third step c) and d), the earth electrode 5 is attached to the spark plug cap and the electrodes are aligned with one another, such that the spark gap 54 is set. In the fourth step e), the earth electrode 5 is fixed to the spark cap, such that the earth electrode 5 no longer slips during the subsequent fitting of the spark cap together with the earth electrode 5 in the housing 2.

The invention claimed is:

1. A spark plug, comprising:
- a housing;
- an insulator arranged within the housing;
- a center electrode arranged within the insulator; and
- an earth electrode arranged within the housing and between the housing and the insulator;
- wherein the earth electrode and the center electrode are arranged such that they form a spark gap, and the spark gap is within the housing,
- wherein the housing has a projection on its inner side, the earth electrode being arranged between the housing projection and the insulator and providing a seal,
- wherein the insulator has a step at a combustion chamber-side end of the insulator, and the earth electrode is attached to the step to form a form-fitting connection that fixes the earth electrode to the insulator.

2. The spark plug according to claim 1, wherein the earth electrode is in contact with the insulator and the housing.

3. The spark plug according to claim 2, wherein the earth electrode is a sealing element, the earth electrode sealing an intermediate space between the insulator and the housing.

4. The spark plug according to claim 1, wherein the earth electrode has a base body and the base body is annular, wherein the earth electrode is in contact with the annular base body along a circumference of the insulator.

5. The spark plug according to claim 4, wherein the annular base body of the earth electrode has at least one inwardly directed support arm that, together with the center electrode, forms the spark gap.

6. The spark plug according to claim 1, wherein the spark gap has a spacing T of: (i) T=0.1 mm or greater, and/or (ii) T=15 mm or less from a combustion chamber-side end face of the housing.

7. The spark plug according to claim 1, wherein a width of the spark gap is not greater than 0.3 mm.

8. A production method for a spark plug, comprising the following steps:
- a) providing a pre-fitted spark plug cap with an insulator and a center electrode;
- b) providing the earth electrode;
- c) attaching the earth electrode to the spark plug cap;
- d) aligning the earth electrode and setting the spark gap; and
- e) fastening the earth electrode to the spark cap, wherein the insulator has a step at a combustion chamber-side end of the insulator, and the earth electrode is attached to the step to form a form-fitting connection that fixes the earth electrode to the insulator.

9. The production method according to claim 8, wherein steps c) and d) are a common method step.

10. The production method according to claim 8, further comprising:
- f) inserting and fastening in a housing, the spark plug cap together with the earth electrode.

* * * * *